UNITED STATES PATENT OFFICE.

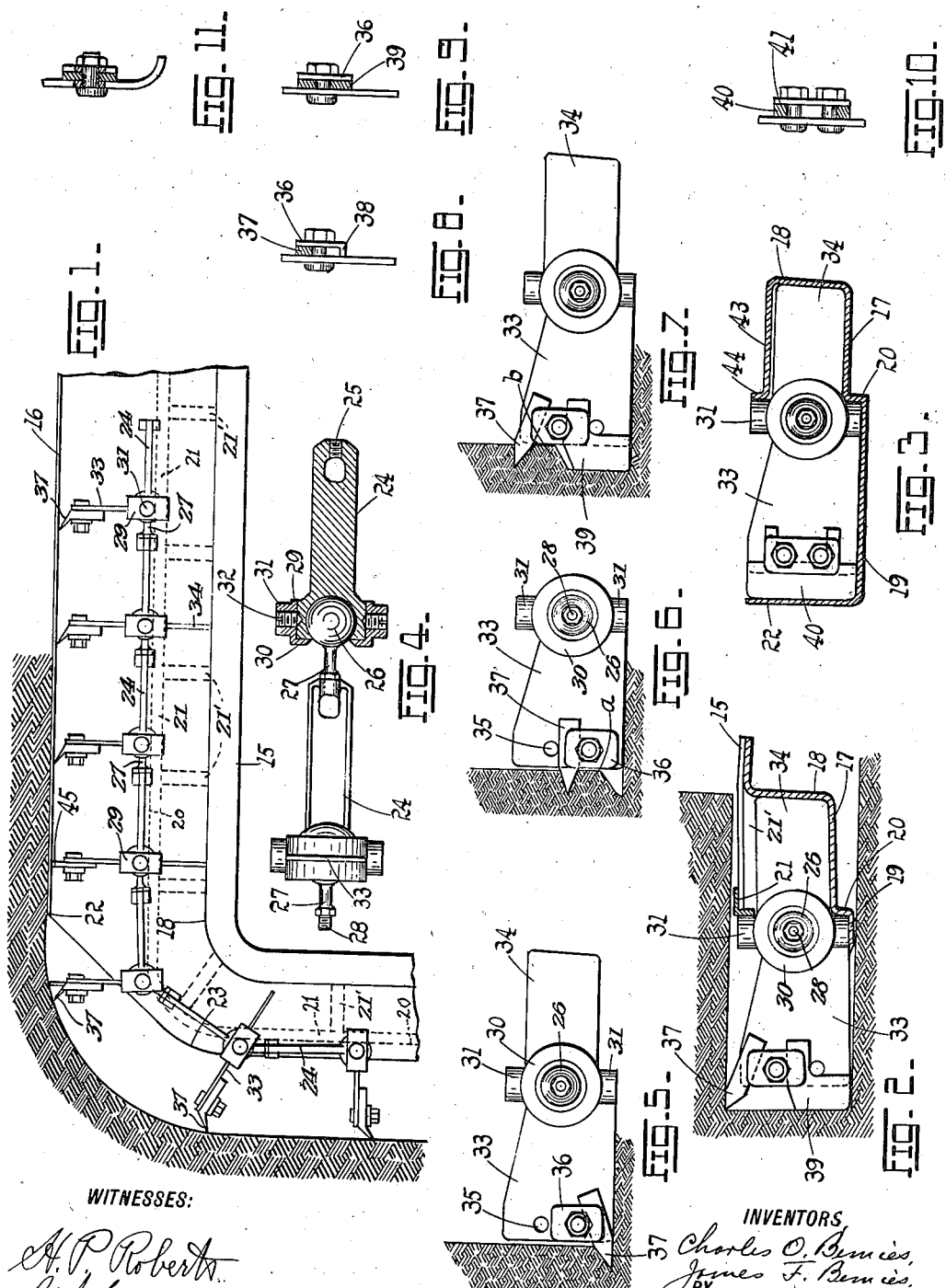

JAMES F. BEMIES, OF NEW YORK, N. Y., AND CHARLES O. BEMIES, OF McCLELLAND-TOWN, PENNSYLVANIA.

COMBINED CONVEYER AND CUTTER CHAIN.

1,209,251.

Specification of Letters Patent.

Patented Dec. 19, 1916.

Application filed November 7, 1910. Serial No. 591,032.

*To all whom it may concern:*

Be it known that we, (1) JAMES F. BEMIES and (2) CHARLES O. BEMIES, citizens of the United States, residing at (1) New York, N. Y., and (2) McClellandtown, Pennsylvania, in the counties of (1) New York and (2) Fayette, and States of (1) New York and (2) Pennsylvania, have invented certain new and useful Improvements in Combined Conveyer and Cutter Chains, of which the following is a specification.

This invention relates to mining machines and more particularly to a conveyer for undercutting, collecting and conveying coal or other material to be mined, and has for its objects; a mechanism arranged to undercut the material by securing cutters to the flights of a conveyer, the conveyer so arranged as to resist or hold the cutters against the cut; a conveyer made in sections so that the connections between the sections will allow the conveyer and flights with cutters secured thereon to readily turn curves in any direction, or to pass around sprocket wheels or guide rolls, for the purpose of driving or guiding the conveyer; to undercut and convey the material undercut to a place of discharge in a simple and effective manner; to collect and convey the material mined to a place of discharge by fastening flight extensions to the flights of the conveyer either in combination with the cutters or without the cutters; to convey the material undercut or material displaced from above the undercut to a place of discharge; to construct a cutter-conveyer so that it can be effectively used with a mechanism for displacing the material above the undercut or arranged to collect the material, when the above mechanism is used; also as an undercutting mechanism.

Further objects will appear from the detail description taken in connection with the accompanying drawings, in which:

Figure 1 is a plan view showing this invention with the position of the upper guide shown in dotted lines; Fig. 2 is a section showing one form of conveyer trough and flight; Fig. 3 is a similar view showing another form of trough and flight; Fig. 4 is a view of two links, one being shown in elevation and the other in section; Fig. 5 is an end view of one form of cutter and a pair of conveyer flights; Fig. 6 is a similar view showing the cutter in a different position and a single conveyer flight; Fig. 7 is a similar view showing the cutter in another position and one form of flight extension; Figs. 8, 9 and 10 are sections showing methods of fastening the cutters and flight extensions in position on the conveyer flights as shown in Figs. 6, 7 and 3, respectively; and Fig. 11 shows a form of flight extension for collecting the coal when the cutter is omitted.

Previously in mining coal by machinery the coal was first undercut for a certain distance, the most common method being to attach cutters to a chain called a cutter-chain, which travels across the face of the coal, usually a section at a time, until the proper depth has been cut. This leaves the coal cut spread along the floor of the chamber and it has to be removed by hand, and is an expensive operation. After undercutting the coal, the undercutting mechanism has to be drawn back to make room for a conveyer to collect the coal displaced from above the undercut by a separate mechanism, and convey the coal displaced to a place of discharge, usually employing two or more conveyers before reaching the outside limits of the machine. These methods consume considerable time in lost motions by moving one device out of the way of the other and produce a great amount of dust and waste product and uneven shapes.

It is to overcome the objections in previous machines that this invention combines in one mechanism the undercutting and conveying devices, and to distinguish this new form of cutter from the common form of cutter-chain, we choose to call it a cutter-conveyer and will so use this term in the following explanation. This undercutting cutter-conveyer when combined with a mechanism for displacing the coal above the undercut, is arranged to collect the coal displaced from above and convey it to a place of discharge outside the limits of the machine. A machine so arranged is shown and described in our co-pending application Serial No. 591,031, filed Nov. 7, 1910, where an application for an undercutting mechanism and a mechanism to act as an undercutting and displacing mechanism is described. This shows one application to which this cutter-conveyer can be used to advantage.

The conveyer trough 15 is preferably made of sheet metal and provided with an outer side 16, an offset bottom 17, and an inner side 18. The bottom proper 19 is offset to form a ledge 20 forming a guideway extending along the trough and another guideway 21 is formed in this case, by an angle iron which is secured to the trough by means of braces 21' as indicated in Fig. 2. The side 16 is cut off at 22 and the bottom at 23 so that the cutters and conveyer flights will project beyond the same for the purpose of permitting the cutters to bite into the coal. The conveyer comprises a series of connected sections provided with flights, flight extensions and cutters. Each section 24 is provided with a tapped hole 25 and a socket for a ball 26, on a section 27, provided with a threaded end 28 adapted to screw into the tapped hole 25. The section 24 is preferably I section.

The ball and socket can be assembled in various manners, for instance by casting the socketed section on the ball section, or by leaving one end of the socket open and peening, or rolling the open end over after the ball section has been placed in the socket. The ball and socket construction may, however, be formed in any other suitable manner. The sections when assembled will have a jointed connection, the joints being universal in their movements.

The outside of the socket end of section 24 is cylindrical and is adapted to receive a ring 29 provided with a stop flange 30. This ring has formed integral therewith a pair of trunnion bearing members 31 which are adapted to bear against the guides 20, 21, and guide the conveyer in its movements in the trough. The ring 29 has secured to it or formed integral therewith one or a pair of flights 33, 34, and is secured in place on the section 24 by screws 32, the stop flange 30 taking the working strains. This ring may however be shrunk in place if so desired. The flight 33 is provided with a series of holes 35 adapted to receive bolts for bolting cutters or extensions to the flights. Such cutters are shown at 37, and the extensions at 39 and 40, in Figs. 5, 7 and 3. The cutters and extensions are secured in position by clamp plates 36 and 41 and bolts as is common to the art. Where only a single cutter is used as 37, then the plate 36 is provided with a flange 38 to take up the strain.

The cutter-conveyer is guided in the trough by the trunnion members 31 engaging the ledges 20 and 21 and by the flight 34 engaging the bottom 17 of the offset portion of the trough. The lower trunnion member however preferably rests upon the bottom 19 as shown in Fig. 2. The guideways 20 and 21 (Fig. 1) are for the sake of clearness shown by broken lines. Instead of providing a separate guide as 21, the trough may be formed of one piece as shown in Fig. 3, which is a section taken through one of the sides of the trough, and the top 43 bent over as at 44 to form the guide member for the upper trunnion 31. The cutters on succeeding flights are preferably differently arranged. Thus Figs. 3, 5, 6 and 7 represent succeeding flights and the cutters thereon. The extensions 39 and 40 acting in this case as cutters. It will be seen that the cutter 37 (Fig. 5) takes a lower cut, and cutter 37 (Fig. 6) a cut just above it, and cutter 39 (Fig. 7) breaks down the ledge "a" formed between the cuts and at the same time cutter 37 takes another cut forming ledge "b" cutter 40 (Fig. 3) breaks down the ledge "b" and cleans up the entire cut, and completing the conveyer trough in the coal, thereby giving one continuous conveyer trough. By thus arranging the cutters the strain on the conveyer is very much reduced and the cutting is rendered easier. The inside flights 34 are omitted on every alternate section so that the coal will not be crushed as the conveyer goes around a curve. The inside flights 34 have thus a larger spacing than the outside flights 33.

It is not necessary that all the conveyer flights be provided with cutters, but the cutters on every other one, every second one, etc., may be omitted. In this case it is advantageous to provide the conveyer flights with removable extensions as 39 and 40 which can be readily replaced as worn down, and insuring that all the coal is conveyed away. The conveyer flights may also be used with or without the cutters attached, to convey any other material aside from coal whether in mining operations or not; also when not using the cutters, a collector, one form being shown in Fig. 11, may be attached. These collectors and extensions may be of varied shapes to meet different conditions.

It is obvious that this form of conveyer can be adapted to advantage to other forms of mining, excavating, tunneling or ditching machines, therefore we do not wish to confine its use to coal mining machinery alone. The coal mining machine serves as one example to which this form of conveyer can be applied.

What we claim is:

1. In an undercutter for coal the combination with a flexible conveyer-cutter chain moving in a horizontal plane and having a series of sections joined by a ball and socket joint, the ball member being provided with a threaded lug and the socket member with a tapped hole, conveyer flights attached to said section, and a cutter secured to each of said flights.

2. In an undercutter for coal the combination with a flexible conveyer chain moving in a horizontal plane and having a series of joined sections having conveyer flights thereon, and trunnion bearing members on said sections, and a cutter secured to each of said flights.

3. In an undercutter for coal the combination with a flexible conveyer chain moving in a horizontal plane and having a series of joined conveyer flights, a ring fitting one end of a flight, and trunnion bearing members on said ring, and a cutter secured to each of said flights.

4. In an undercutter for coal the combination with a horizontal conveyer trough, of a flexible conveyer chain therein having flights, a cutter on each of the flights, the trough being reduced to form a guide ledge, and the rear portion of said flights being reduced to work in the reduced portion of said trough.

5. In an undercutter for coal the combination with a horizontal conveyer trough, of a flexible conveyer chain therein having flights, a cutter on each of the flights, the trough being reduced to form a guide ledge, and guide members on said conveyer chain bearing on said guideway and resting on said trough.

6. In an undercutter for coal the combination with a horizontal trough, having upper and lower guideways, of a flexible conveyer-cutter chain in said trough, bearing members on said chain engaging the guideways, flights extending on opposite sides of said conveyer chain, the flights on the inside having a larger spacing than those on the outside, and cutters on certain of the outside flights.

7. In an undercutter for coal the combination with a horizontal conveyer trough having upper and lower guideways, of a flexible conveyer-cutter chain in said trough, bearing members on said chain engaging the guideways, flights extending on opposite sides of said conveyer chain, the flights on the inside having a larger spacing than those on the outside, and cutters and flight extensions on certain of the outside flights.

8. In an undercutter for coal the combination with a horizontal conveyer trough having upper and lower guideways, of a conveyer chain in said trough, bearing members on said chain engaging the guideways, flights extending on opposite sides of said conveyer chain, the flights on the inside having a larger spacing than those on the outside, and cutter and flight extensions on certain of the outside flights.

9. A mechanism for undercutting and conveying coal comprising a horizontal trough section open across its top and front sides, the front side of the trough to be placed next to the face of the coal, auxiliary trough sections connecting the ends of the horizontal trough section, a cutter conveyer supported within and movable in said horizontal and auxiliary sections, and a guide above the bend where the horizontal and auxiliary trough sections join.

10. A mechanism for undercutting and conveying coal comprising a horizontal trough section open across its top and front sides, the front side to be placed next to the face of the coal, auxiliary trough sections connecting the ends of the horizontal trough section, a cutter-conveyer supported within and movable in said horizontal and auxiliary trough sections, said cutter conveyer adapted to project through the open front side of the horizontal trough adjacent to the coal and convey away all the coal cut out, and dropped down into the horizontal trough through the open top.

In testimony whereof I affix my signature in presence of two witnesses.

JAMES F. BEMIES.

Witnesses:
E. L. AUSTELL,
E. W. SMITH.

In testimony whereof I affix my signature in presence of two witnesses.

CHARLES O. BEMIES.

Witnesses:
OLIVER HOSTETLER,
THOMAS G. CHRISTOPHER.